United States Patent
Rogers

(10) Patent No.: US 6,942,589 B2
(45) Date of Patent: Sep. 13, 2005

(54) OFFSET STARTER GENERATOR DRIVE UTILIZING A FIXED-OFFSET DUAL-ARM PIVOTED TENSIONER

(75) Inventor: Clayton R. Rogers, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/072,127

(22) Filed: Feb. 8, 2002

(65) Prior Publication Data

US 2003/0153420 A1 Aug. 14, 2003

(51) Int. Cl.⁷ .................................................. F16H 7/08
(52) U.S. Cl. ........................ 474/134; 474/84; 474/135
(58) Field of Search ................................ 474/109, 134, 474/133, 138, 135, 101, 84, 113–117; 123/90.31, 90.27, 90.48; 56/11.6, 17.3, 10.6, 10.8

(56) References Cited

U.S. PATENT DOCUMENTS

| | | | | |
|---|---|---|---|---|
| 4,069,719 A | * | 1/1978 | Cancilla | 474/134 |
| 4,416,647 A | | 11/1983 | White, Jr. | |
| 4,715,333 A | * | 12/1987 | Oyaizu | 123/90.31 |
| 4,758,208 A | * | 7/1988 | Bartos et al. | 474/135 |
| 4,981,116 A | * | 1/1991 | Trinquard | 474/134 |
| 5,002,519 A | * | 3/1991 | Oshima et al. | 474/134 |
| 5,012,632 A | * | 5/1991 | Kuhn et al. | 56/11.6 |
| 6,167,686 B1 | * | 1/2001 | Becker et al. | 474/109 |
| 6,506,137 B2 | * | 1/2003 | Guhr | 474/134 |

FOREIGN PATENT DOCUMENTS

| | | | |
|---|---|---|---|
| DE | 19926612 A1 | 12/2000 | |
| GB | 2345584 A | * 7/2000 | H02K/53/00 |
| JP | 58-178042 A | * 10/1983 | |
| JP | 06-94091 A | * 4/1994 | |
| WO | WO 00/77421 A1 | 12/2000 | |
| WO | WO 00/77422 A1 | 12/2000 | |

* cited by examiner

Primary Examiner—Marcus Charles
(74) Attorney, Agent, or Firm—Joseph V. Tassone; Thompson Hine, LLP

(57) ABSTRACT

A method and system are taught for a tensioner for an endless power transmission belt in an engine. The method and system comprise an AGS pulley and crankshaft pulley coupled to the belt, one of the AGS pulley or the crankshaft pulley operating as a driving pulley that drives the belt so that a tight span and slack span are created in the belt on opposite sides of the driving pulley. The method and system also comprise accessory pulleys coupled to the belt. The tensioner comprises first and second arms, each arm rotatably coupled to a pulley, the pulleys being positioned such that a first one of the pulleys is coupled to the tight span and a second one of the pulleys is coupled to the slack span.

14 Claims, 2 Drawing Sheets

OFFSET STARTER GENERATOR DRIVE
UTILIZING A FIXED-OFFSET DUAL-ARM
PIVOTED TENSIONER

FIELD OF THE EMBODIMENTS

The embodiments are related to a tensioner for an endless power transmission belt in an optimal position when an alternator and generator and starter ("AGS") apparatus is driving an engine.

BACKGROUND

Conventional automotive serpentine (V-ribbed) belt-driven front-end accessory drives consist of a driver pulley at an engine crankshaft, one or more driven pulleys at various accessories, and a spring-loaded single-arm or dual-arm pivoted tensioner pulley(s), usually located at least in the slack span of the driver/crankshaft pulley. The engine is started with a starter that engages and starts the engine, and then disengages once its started. One of the accessories may be an alternator/generator for supplying electrical power to the vehicle. In this configuration, a slack span of a driven/crankshaft pulley is the optimal location for the spring-loaded tensioner pulley(s) because the tension in that span may not be reduced by the span tensioning differences cause by the accessory pulley loads. In fact, the tension may be increased by the span tensioning differences caused by the accessory pulley loads.

It is known in the art to provide a tensioner for an endless power transmission belt that is driven by a crankshaft, where the belt is employed in driving a sheave comprising at least one accessory, which upon being driven creates a slack side and a tight side in the belt on opposite sides of the sheave and the tensioner comprises a first and second support arm, each respectively having pivot means, first and second idler pulleys carried by the first and second support arms, respectively, and a pivot pin extending through the pivot means and pivotally supporting the arms adjacent opposite sides of the sheave with the first pulley engaging the slack side and the second pulley engaging the tight side to enable tensioning thereof and in a similar manner as disclosed in U.S. Pat. No. 4,416,647. This reference is hereby incorporated herein by reference.

One aspect may be to provide an improved tensioner and positioning of a tensioner for an endless power transmission belt in an engine utilizing an AGS as the driving device.

Another aspect may be to provide an improved tensioner that also provides dampening of the belt, and thereby assures smooth running thereof free of vibration and/or oscillation.

SUMMARY OF THE EMBODIMENTS

A manifestation provides a system comprising a tensioner for an endless power transmission belt in an engine. The system comprising an AGS pulley and crankshaft pulley coupled to the belt, one of the AGS pulley or the crankshaft pulley operating as a driving pulley that drives the belt so that a tight span and slack span are created in the belt on opposite sides of the driving pulley. The system also comprising accessory pulleys coupled to the belt. The tensioner comprising first and second arms, each arm rotatably coupled to a pulley, the pulleys being positioned such that a first one of the pulleys is coupled to the tight span and a second one of the pulleys is coupled to the slack span.

Another aspect may be that the first and second arms are maintained at a constant angle with respect to each other.

Another aspect may be that one of the first and second arms forms a positive differential angle with respect to the belt and another one of the arms forms a negative differential angle with respect to the belt.

Another aspect may be that when the engine is started with the AGS a torque of a resilient device is configured to be less than a counteracting torque generated by a force imparted by a first one of the arms rotatably coupled to a first one of the pulleys in the tight span and force imparted by a second one of the arms rotatably coupled to a second one of the pulley in the slack span, such that slippage of the belt is prevented.

Another aspect may be that the tight span is located in an exit area of the crankshaft pulley and the slack span is located in an exit area of the AGS pulley.

Another manifestation provides a method of utilizing a tensioner for an endless power transmission belt in an engine. The method comprises the steps of providing an AGS pulley and crankshaft pulley coupled to the belt, one of the AGS pulley or the crankshaft pulley operating as a driving pulley that drives the belt so that a tight span and slack span are created in the belt on opposite sides of the driving pulley. The method also comprises the step of providing accessory pulleys coupled to the belt. The method also comprises the step of providing the tensioner with first and second arms, each arm rotatably coupled to a pulley, the pulleys being positioned such that a first one of the pulleys is coupled to the tight span and a second one of the pulleys is coupled to the slack span.

Another manifestation provides a system comprising a tensioner for an endless power transmission belt in an engine. The system comprises an AGS pulley, a crankshaft pulley, and an accessory pulley coupled to the belt, such that, when one of the AGS pulley or the crankshaft pulley operates as a driving pulley to drive the engine a tight span is created on an exit side of the crankshaft pulley and a slack span is created on an exit side of the AGS pulley. The tensioner comprises first and second arms, each arm rotatably coupled to a pulley, the pulleys being positioned to be coupled to the belt on the opposite sides of the driving pulley.

Another manifestation provides a system comprising a tensioner for an endless power transmission belt in an engine. The system comprises an AGS pulley and a crankshaft pulley coupled to the belt, such that when one of the AGS pulley or the crankshaft pulley operates as a driving pulley to drive the engine a slack span and a tight span are created in the belt on opposite sides of the driving pulley. The system also comprises accessory pulleys driven by the belt. The tensioner comprising first and second fixed-offset arms, each arm rotatably coupled to a pulley, the pulleys being positioned to be coupled to the belt on the opposite sides of the driving pulley.

BRIEF DESCRIPTION OF THE DRAWINGS

Further features will become apparent to those skilled in the art to which the embodiments relate from reading the following specification and claims, with reference to the accompanying drawing, in which:

DESCRIPTION OF THE PREFERRED EMBODIMENT(S)

Figure 1:
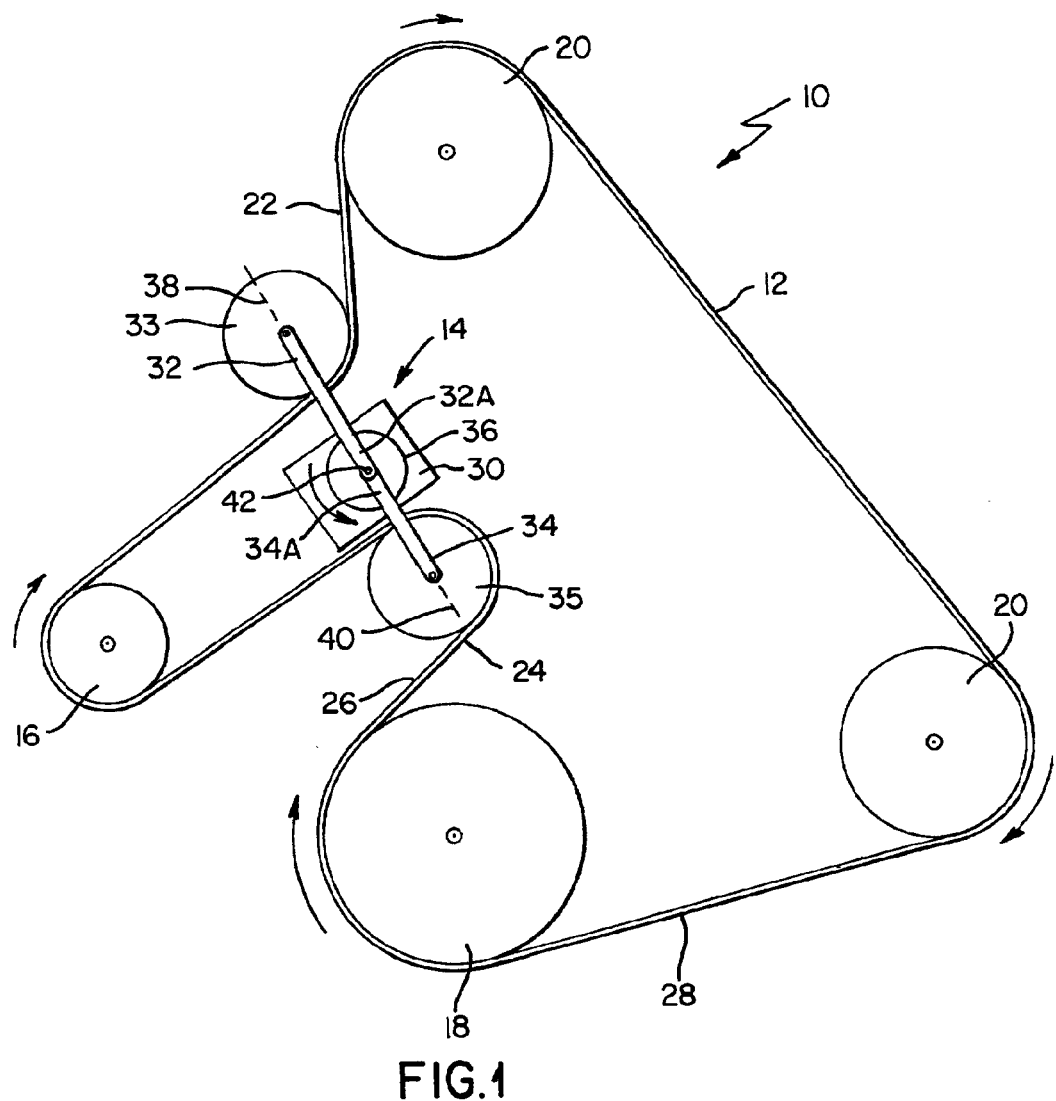
FIG. 1 is a view of an embodiment of a fixed-offset tensioner in a system with an AGS pulley driving a belt in the system.

Reference is made to FIG. 1 that illustrates a section of a front end of a motor vehicle engine, shown as an automobile engine, which is designated generally by the reference numeral 10. This engine utilizes an endless transmission belt 12 for driving a plurality of driven accessories and a tensioner 14 for the belt 12. The tensioner 14 may be a tensioner-dampener that may provide tensioning and dampening functions for the belt 12. The endless power transmission belt 12 may be of any suitable material type known in the art, maybe polymeric material.

The belt 12 is driven by a driving pulley 16, which is operatively connected to the engine, and in particular is connected to the alternator and generator and starter (AGS) apparatus of the engine 10. Innovations in the automobile industry have led to engines 10 utilizing the AGS as the motor for starting the engine 10 to eliminate a separate starter device required in the prior art. The AGS also powers, via the belt 12, a crankshaft through a crankshaft pulley 18 and one or more accessories through their respective accessory pulleys 20. During operation with the AGS as the motor for driving the engine 10, a driving pulley is the AGS pulley 16 and the driven pulley may be the crankshaft pulley 18 or an accessory pulley(s) 20. In this arrangement, an optimal location for the tensioner 14 is adjacent a slack span 22 and tight span 24 on opposite sides of the AGS pulley 16, instead of the slack span 26 and tight span 28 on opposite side of the crankshaft pulley 18. In an embodiment, one of the accessories may be an air conditioning compressor powered while the engine 10 may be off, which might require the engine 10 to be de-coupled from the AGS pulley 16.

The tensioner 14 comprises a base 30 coupled to a section of the engine 10, as may be known in the art. The tensioner 14 further comprises arms 32 and 34 and a resilient device 36, which may be a spring device, such as a flat spiral spring. The arm 32 is coupled at a first end 32A to the resilient device 36, while the arm 34 is coupled at a first end 34A to the resilient device 36. The arms 32 and 34 are positioned within the tensioner 14 so as to maintain a constant angle between them. Thus, the tensioner 14 is a fixed-offset dual arm tensioner. Also, the arm 32 has a rotatably coupled pulley 33 and the arm 34 has a rotatably coupled pulley 35. Further, the arms 32 and 34 are pivotally coupled to the base 30 around point 42 via pivoting devices known in the art. In other embodiment the arms 32 and 34 may pivot around separate pivoting points. A first one of the arms 32 is positioned so as to form a negative differential angle with respect to the belt 12 and a second one of the arms 34 is positioned so as to form a positive differential angle with respect to the belt 12. In other embodiments, the opposite arm may form the positive and negative differential angles with respect to the belt. Thus, the first one of the arms 32 will not supply any tension to the slack span 22, but assists the second one of the arms 34 and the resilient device 36 to supply an appropriate tension to the slack span 22. During operation, the tensioner pulley, maybe 34, with a positive differential angle is located in an exiting span of the crankshaft pulley 18 and the tensioner pulley, maybe 32, with a negative differential angle is located in the exiting span of the AGS pulley 16.

Certain aspects of the tensioner 14 are met through configuring desired parameters for the tensioner 14. The parameters may be: the location of the pulleys 33 and 35, an angle between the arms 32 and 34, a length of the arms 32 and 34, the tensioner pivot point 42, and a torque and torque direction of the resilient device 36. An aspect of the tensioner 14 may be so that is has positive take-up of the belt 12, which is defined as a change in tensioner arm angle in the direction of torque of the resilient device 36 divided by a corresponding change in a length of the belt 12. Another aspect of the tensioner 14 may be that when the engine 10 is running there is sufficient torque from the resilient device 36 to impart a required span tension at the pulley 35 in the slack span 26 of the crankshaft pulley 18 in order to prevent excessive belt slippage with worst-case accessory loading.

Another aspect of the tensioner 14 may be that when starting the engine 10 or powering accessories with the AGS, a torque of the resilient device 36 is low enough to be overcome by a counteracting torque generated by a force imparted on the pulley 35 in the tight span 24 of the AGS pulley 16. This results in sufficient force imparted by the pulley 33 in the slack span 22 of the AGS pulley 16 so as to provide a required, desired, or predetermined tension in the slack span 22 to prevent excessive slippage of the belt 12 with worst case crankshaft or accessory loading.

Another aspect of the tensioner 14 may be that the tension produced in the tight span 24 is used to tension the belt 12 in the slack span 22 where the amount of tension imparted on the belt due to this effect is dependent on the tensioner arms lengths, the differential angles (always of opposite signs), and the tension in the tight span 24 (a function of pulley loads). Due to this effect, the system provides a variable tension drive that imparts a variable tension based on the pulley loads, which is desirable because the belt tension should be lower when the pulley loads are lower, and vice versa. A life of the belt 12 is also improved. In contrast, prior art devices are designed to impart the required tension based on the worst case/maximum pulley loading, which results in too great a tension under less-than worst case/ maximum pulley loading. Hence, the prior art systems have less than optimal belt life under these conditions.

Figure 2:
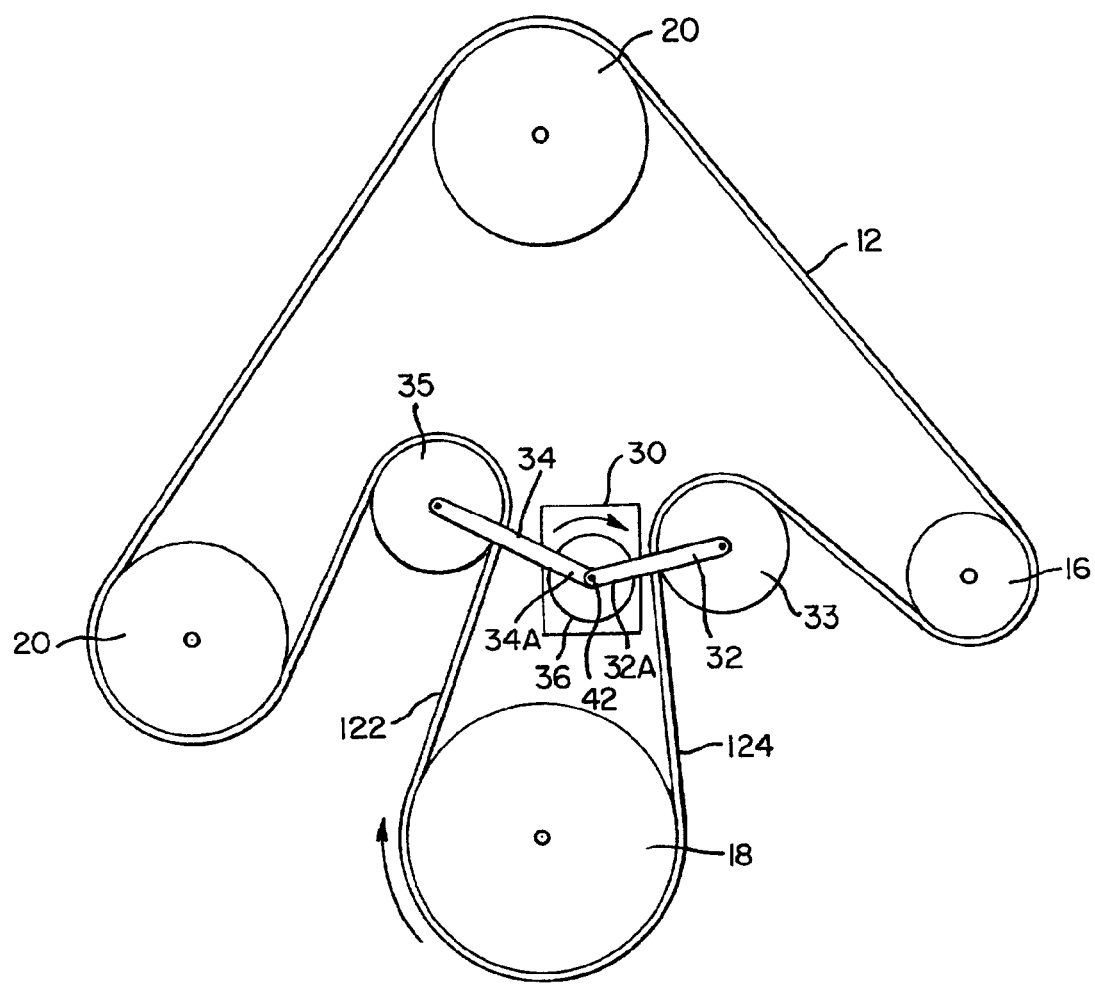
FIG. 2 is a view of another embodiment of a fixed-offset tensioner in a system with an AGS pulley driving a belt in the system.

Another embodiment is shown in FIG. 2, which contains similar elements as FIG. 1 except the tensioner arms 32 and 34 are located on opposite sides of the crankshaft pulley 18 and the AGS pulley 16 is located in the entering span of the crankshaft pulley 18. In this arrangement, when the AGS pulley 6 is the driver pulley, the span between the crankshaft pulley 18 and the AGS pulley 16 is a slack span 124 and the span between the crankshaft pulley 18 and accessory pulley 20 is a tight span 122. The functioning of this arrangement is similar to the functioning of the system in FIG. 1, which will not be repeated for convenience. In this embodiment shown in FIG. 2, a tension in the belt 12 varies based on the crankshaft pulley tension difference, which is in contrast to varying the tension on the belt 12 based on the AGS pulley tension difference depicted in FIG. 1.

The embodiments have been described in detail with respect to specific embodiments thereof, but it will be apparent that numerous variations and modifications are possible without departing from the spirit and scope of the embodiments as defined by the following claims.

What is claimed is:

1. A belt tensioning system comprising:

an AGS pulley and crankshaft pulley engaged with a belt, one of the AGS pulley or the crankshaft pulley operating as a driving pulley that drives the belt so that a tight span and slack span are created in the belt on opposite sides of the driving pulley; and a tensioner comprising a base, first and second pivotable arms that are maintained at a constant angle with respect to each other, first and second pulleys that are rotatably coupled to the first and second arms, respectively, and a resilient device coupling the first and second arms to the base, the pulleys being positioned such that one of the pulleys is engaged with the tight span and the other pulley is engaged with the slack span;

wherein the AGS pulley is connected to an alternator and generator and starter apparatus.

2. The system of claim 1, wherein the system is configured to perform positive belt take-up.

3. The system of claim 1, wherein when the engine is running the arm and the pulley engaged with the tight span generate a desired tension in the slack span of the belt with the arm and pulley engaged with the slack span to prevent slippage of the belt.

4. The system of claim 1, wherein the tight span is created on an exit side of the crankshaft pulley and the slack span is created on an exit side of the AGS pulley.

5. The system of claim 1 wherein the AGS pulley is driving pulley and the crankshaft pulley is driven pulley.

6. The system of claim 5 wherein the pulleys on the first and second arms of the tensioner contact the belt on opposite side of the AGS pulley.

7. A method of utilizing a tensioner for an endless power transmission belt in an engine, the method comprising the steps of:
providing an AGS pulley and crankshaft pulley engaged with the belt, one of the AGS pulley or the crankshaft pulley operating as a driving pulley that drives the belt so that a tight span and slack span are created in the belt on opposite sides of the belt of the driving pulley;
providing the tensioner with a base, first and second pivotable arms that are maintained at a constant angle with respect to each other, first and second pulleys rotatably coupled to the first and second arms, respectively, and a resilient device coupling the first and second arms to the base, the pulleys being positioned such that one of the pulleys is engaged with the tight span and the other pulley is engaged with the slack spans;
wherein the AGS pulley is connected to an alternator and generator and starter apparatus.

8. The method of claim 7 further comprising the steps of creating the tight span on an exit side of the crankshaft pulley and creating the slack span on the exit side of the AGS pulley.

9. The method of claim 7 wherein the AGS pulley is a driving pulley and the crankshaft pulley is the driven pulley.

10. The method of claim 9 wherein the pulleys on the first and second arms of the tensioner contact the belt on opposite sides of the AGS pulley.

11. A system comprising:
an AGS pulley connected to an alternator starter generator apparatus;
a crankshaft pulley connected to a crankshaft of an engine;
a belt engaged with and coupling the AGS pulley and the crankshaft pulley; and
a tensioner comprising a base, first and second arms pivotably coupled to the base, first and second pulleys rotatatably coupled to the first and second arms, respectively, and a spring coupling at least one of the first and second arms to the base;
wherein the first tensioner pulley is engaged with a span of the belt located between an entrance side of the crankshaft pulley and an exit side of the AGS pulley, and wherein the second tensioner pulley is engaged with a span of the belt located between an exit side of the crankshaft pulley and an entrance side of the AGS pulley.

12. A system as claimed in claim 11, wherein the first and second arms are coupled for pivotable movement together.

13. A system as claimed in claim 12, wherein the first and second arms pivot about a common axis.

14. A system as claimed in claim 12, wherein the first and second arms are maintained at a constant angle with respect to each other.

* * * * *